(12) United States Patent
Gora

(10) Patent No.: US 9,494,455 B1
(45) Date of Patent: Nov. 15, 2016

(54) APPARATUS FOR DELIVERY OF A METERED DOSE OF GRANULAR MATERIAL

(71) Applicant: Arthur Gerald Gora, Fremont, CA (US)

(72) Inventor: Arthur Gerald Gora, Fremont, CA (US)

( * ) Notice: Subject to any disclaimer, the term of this patent is extended or adjusted under 35 U.S.C. 154(b) by 126 days.

(21) Appl. No.: 14/475,020

(22) Filed: Sep. 2, 2014

Related U.S. Application Data

(60) Provisional application No. 61/959,842, filed on Sep. 3, 2013.

(51) Int. Cl.
*G01F 11/28* (2006.01)
*G01F 11/26* (2006.01)

(52) U.S. Cl.
CPC .................................. *G01F 11/261* (2013.01)

(58) Field of Classification Search
CPC ...... G01F 11/261; G01F 11/34; G01F 11/32; G01F 11/025; G01F 11/028; G01F 11/263; G01F 11/262; B67D 3/0032
USPC ................................................ 222/449, 431
See application file for complete search history.

(56) References Cited

U.S. PATENT DOCUMENTS

| | | | |
|---|---|---|---|
| 576,241 A | 2/1897 | Van Ame | |
| 845,347 A | 2/1907 | Gesell | |
| 897,453 A | 9/1908 | Byam | |
| 903,548 A | 11/1908 | De Hayes | |
| 913,027 A | 2/1909 | Meaker | |
| 934,493 A | 9/1909 | Wolkenstein | |
| 1,062,576 A | * 5/1913 | Baskett | A47K 5/1207 222/449 |
| 1,084,530 A | 1/1914 | Bettman | |
| 1,123,974 A | 1/1915 | Antoine et al. | |
| 1,270,262 A | 6/1918 | Buckland | |
| 1,618,688 A | 2/1927 | Tempest | |
| 1,707,967 A | 4/1929 | Abbott | |
| 1,727,799 A | 9/1929 | Abbott | |
| 1,763,449 A | 6/1930 | Trautvetter | |
| 1,877,808 A | 9/1932 | Cagliostro | |
| 1,891,787 A | 12/1932 | Swartz | |
| 1,938,100 A | 12/1933 | Gessler | |
| 1,941,745 A | 1/1934 | Higley | |
| 1,947,310 A | * 2/1934 | Sample | G01F 11/32 222/321.6 |
| 1,982,094 A | 11/1934 | Gessler | |
| 2,021,004 A | 11/1935 | Garrido | |
| 2,022,031 A | 11/1935 | Fisher | |
| 2,136,805 A | 11/1938 | Scharinger | |

(Continued)

*Primary Examiner* — Patrick M Buechner
*Assistant Examiner* — Jeremy W Carroll
(74) *Attorney, Agent, or Firm* — Brundidge & Stanger, P.C.

(57) ABSTRACT

An apparatus is provided for delivering a metered dose of a granular material. The apparatus holds the granular material captive at any angle until use. In use, the apparatus is typically inverted and the plunger rod is plunged on a surface and released. During the release the metered dose of material is transferred to a holding area. While still inverted, the apparatus is shaken/agitated/oscillated to release the metered dose of material from the holding area out the exit holes while the bulk of granular material is once again sealed at any angle. The granular material is evenly spread to the desired surface through perforations in the cap portion of the apparatus. It should also be noted that the apparatus can also have its rod plunged in an upright position then inverted and shaken/agitated/oscillated to release the metered dose of material. The apparatus is normally sealed; it can be carried on ones' person or in a pocket or purse. The intent of the design of this apparatus is to lower the salt intake for humans for consumer and retail use.

16 Claims, 1 Drawing Sheet

(56) References Cited

U.S. PATENT DOCUMENTS

| | | | |
|---|---|---|---|
| 2,216,347 A * | 10/1940 | Humbard | G01F 11/263 222/449 |
| 2,423,784 A | 7/1947 | Mackey | |
| 2,604,235 A | 7/1952 | Teston | |
| 2,644,616 A | 7/1953 | Gordon | |
| 2,693,301 A | 11/1954 | Allen, Jr. | |
| 2,704,623 A | 3/1955 | Yasso | |
| D177,373 S | 4/1956 | Gilbert | |
| 2,752,076 A | 6/1956 | Locker | |
| 2,980,297 A | 4/1961 | Tucci | |
| 3,172,580 A | 3/1965 | Mackey | |
| 3,229,856 A | 1/1966 | Jungmann | |
| 3,258,177 A | 6/1966 | Ellis | |
| 3,323,683 A | 6/1967 | Cianciolo | |
| 3,344,962 A | 10/1967 | Popivalo | |
| 3,353,725 A | 11/1967 | Caceres | |
| 3,398,857 A | 8/1968 | Alio | |
| 4,201,320 A | 5/1980 | Eppenbach | |
| 4,210,263 A * | 7/1980 | Bos | G01F 11/32 222/449 |
| D259,090 S | 5/1981 | Cowan | |
| 4,424,921 A | 1/1984 | Feuerstein et al. | |
| 4,728,011 A | 3/1988 | Schuster et al. | |
| 4,757,916 A | 7/1988 | Goncalves | |
| 4,779,771 A | 10/1988 | Song | |
| 4,790,453 A | 12/1988 | Fontana et al. | |
| 4,828,149 A | 5/1989 | Hester | |
| D305,196 S | 12/1989 | Persoff | |
| 4,951,839 A | 8/1990 | Kong | |
| 4,961,521 A | 10/1990 | Eckman | |
| 5,024,616 A | 6/1991 | Ogle, II | |
| D318,778 S | 8/1991 | Fiore et al. | |
| D328,009 S | 7/1992 | Kornick et al. | |
| 5,169,049 A | 12/1992 | Krupic et al. | |
| D336,728 S | 6/1993 | Ancona et al. | |
| D336,821 S | 6/1993 | Ancona et al. | |
| D336,822 S | 6/1993 | Ancona et al. | |
| 5,346,105 A | 9/1994 | Onneweer | |
| D351,764 S | 10/1994 | Johnson et al. | |
| 5,454,487 A | 10/1995 | Vassiliou | |
| 5,467,903 A | 11/1995 | Sorensen et al. | |
| 5,601,213 A | 2/1997 | Daniello | |
| 5,683,361 A | 11/1997 | Elk et al. | |
| 5,711,463 A | 1/1998 | Chen et al. | |
| D401,115 S | 11/1998 | Huang | |
| 5,839,619 A | 11/1998 | Willer | |
| 5,894,965 A | 4/1999 | Robbins, III et al. | |
| D437,745 S | 2/2001 | Young et al. | |
| D440,156 S | 4/2001 | Lonczak et al. | |
| 6,269,983 B1 | 8/2001 | Jones et al. | |
| D451,812 S | 12/2001 | Colonna de Giovellina | |
| D452,119 S | 12/2001 | Zeller et al. | |
| 6,382,461 B1 | 5/2002 | Olsson | |
| 6,422,426 B1 | 7/2002 | Robbins, III et al. | |
| 6,494,350 B2 | 12/2002 | Kelley | |
| 6,516,973 B2 | 2/2003 | Chrisman et al. | |
| D496,830 S | 10/2004 | Hockey | |
| 6,948,641 B1 | 9/2005 | Williams | |
| 7,143,909 B2 | 12/2006 | Peterson et al. | |
| D581,742 S | 12/2008 | Krus et al. | |
| D588,872 S | 3/2009 | Gospodarski | |
| D602,785 S | 10/2009 | Rothberg et al. | |
| D652,260 S | 1/2012 | Miller | |
| 8,366,027 B2 | 2/2013 | Antal et al. | |
| 2001/0007327 A1 | 7/2001 | Ritsche et al. | |
| 2002/0066747 A1 | 6/2002 | Argentieri et al. | |
| 2005/0258189 A1 | 11/2005 | Peterson et al. | |
| 2010/0072229 A1 * | 3/2010 | Veltrop | A47G 19/183 222/207 |
| 2013/0108353 A1 * | 5/2013 | Shah | A45D 34/04 401/172 |

* cited by examiner

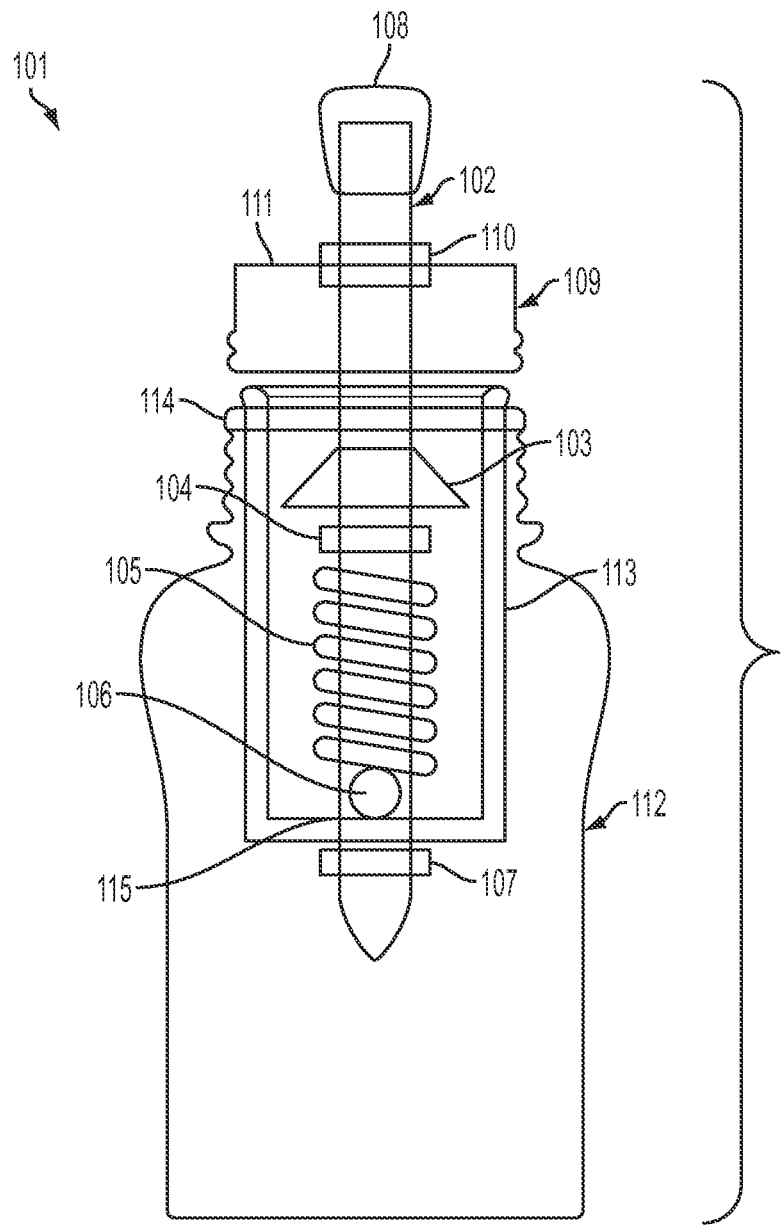

APPARATUS FOR DELIVERY OF A METERED DOSE OF GRANULAR MATERIAL

CROSS-REFERENCE TO RELATED APPLICATION

This application claims benefit under 35 USC 119(e) of U.S. Provisional Patent Application No. 61/959,842, filed on Sep. 3, 2013, entitled "APPARATUS FOR DELIVERY OF A METERED DOSE OF GRANULAR MATERIAL," which is incorporated herein by reference in its entirety.

FIELD OF THE INVENTION

The device relates to dispensers for delivering a predetermined amount of granular/particulate material.

BACKGROUND

Granular/particulate/salt/pepper dispensers have been patented since 1907. Various implementations and techniques have been used to deliver predetermined amounts of material to date. This implementation described herein leverages a novel way of measuring and delivering that utilizes comfortable ergonomics, use, and delivery that is familiar to those that have used salt and pepper shakers historically without foreign tilts, inversions or hand gestures.

SUMMARY

An apparatus is provided for delivering a metered dose of a granular material. The apparatus includes a container assembly including a reservoir area for holding granular material which is captive at any angle until use. The apparatus also includes a cap portion covering the reservoir area. The cap portion includes exit holes therethrough. The apparatus further includes a plunger rod located therein and is plunged on a surface of the reservoir area. Granular material is sealed at any angle; by the plunger rod. The granular material is evenly spread to a desired surface through the exit holes in the cap portion.

BRIEF DESCRIPTION OF THE DRAWINGS

For the purpose of illustrating the invention, the drawing shows forms of the invention that are presently preferred. However, it should be understood that this invention is not limited to the precise arrangements and instrumentalities shown in the drawings.

FIG. 1 is a perspective view of an embodiment of the Apparatus for Delivery of a Metered Dose of Granular Material shown in a resting position.

DETAILED DESCRIPTION

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

| Element Number | Name |
| --- | --- |
| FIG. 1 101 | Metered Dose Delivery Material Shaker |
| 102 | Plunger rod |
| 103 | Reservoir cup |
| 104 | Holding pin/e-ring for spring |
| 105 | Spring |
| 106 | Material loading hole |
| 107 | Holding pin/e-ring for assembly |
| 108 | Plunger rod anti-mar anti-skid bumper |
| 109 | Perforated cap |
| 110 | Actuator rod guide |
| 111 | Material exit holes |
| 112 | Container to hold bulk material with threads at top |
| 113 | Transfer canister |
| 114 | Transfer canister gasket |
| 115 | Transfer canister hole |

FIG. 1 is an illustration of an apparatus for delivery of a metered dose of granular material 101 according to an embodiment of the present invention. In this embodiment there is a container 112 one purpose of which is to deliver a metered amount of material by grasping container 112 right side up or upside down and plunging plunger rod 102 to deliver a metered amount of material from material-loading hole 106 to reservoir cup 103. Shaking container 102 delivers the metered material through screw-on cap 109 through material exit holes 111.

An actuator rod 102 may be fashioned of any one of a number of materials such as wood, iron, stainless steel, plastic, alloy steel for example, depending at least in part on intended uses and cost factors. In some instances wood may be preferable for non-toxic food applications as well as wicking moisture from the bulk material. The diameter of actuator rod 102 may, in other embodiments be increased or decreased to accommodate larger or smaller material acceptance hole 106 to change the dose amount.

A reservoir cup 103 may be formed around actuator rod 102 and may be fashioned of any one of a number of materials such as wood, iron, stainless steel, plastic, alloy steel for example, depending at least in part on intended uses and cost factors. In some instances wood may be preferable for non-toxic food applications.

A holding pin or e-ring for spring 104 may be used placed in the back region of actuator rod 102 to hold further assembly components captive.

A spring 105 may be used to keep holding pin or e-ring for assembly 107 flush with insert container 113 and may be fashioned of any one of a number of materials such as wood, iron, stainless steel, plastic, alloy steel for example, depending at least in part on intended uses and cost factors. In some instances plastic, wood or stainless steel may be preferable for non-toxic food applications.

A material loading hole 106 may be used to gather the delivery material for dispersion. The diameter may be varied to facilitate the amount of material gathered for delivery. In this embodiment material loading hole delivers 100 milligrams of material.

A holding pin or e-ring for assembly 107 may be used to hold further assembly components captive and may be fashioned of any one of a number of materials such as wood, iron, stainless steel, plastic, alloy steel for example, depending at least in part on intended uses and cost factors. In some instances plastic, wood or stainless steel may be preferable for non-toxic food applications.

A plunger rod anti-mar anti-skid bumper 108 may be used to facilitate the plunger action on a surface without marring such surface and to prevent skidding when apparatus is used.

The plunger rod anti-mar anti-skid bumper 108 may be fashioned of any one of a number of materials such as wood, iron, stainless steel, plastic, alloy steel for example, depending at least in part on intended uses and cost factors. In some instances plastic, wood or stainless steel may be preferable for non-toxic food applications. In this embodiment, synthetic rubber is used.

A perforated cap 109 may be used for the final delivery of material. The perforated screw-on top may be fashioned of any one of a number of materials such as wood, iron, stainless steel, plastic, alloy steel for example, depending at least in part on intended uses and cost factors. In some instances plastic, wood or stainless steel may be preferable for non-toxic food applications. In this embodiment, stainless steel is used. The perforated cap 109 can be a plug, threaded or other means to hold the perforated cap 109 captive. In this embodiment, threads are used.

An actuator rod guide 110 may be used to provide a slippery, non-binding guide for actuator rod 102. The actuator rod guide 110 may be fashioned of any one of a number of materials such as wood, iron, stainless steel, plastic, alloy steel for example, depending at least in part on intended uses and cost factors. In some instances plastic or stainless steel may be preferable for non-toxic food applications. In this embodiment, nylon plastic is used.

A perforation holes for delivery of material 111 may be used for the final delivery exit of the material. The size of the perforations can be varied to facilitate the amount of agitation and/or aeration of the material during delivery.

A container to hold bulk material with threads at top 112 may be constructed of any one of a number of materials such as wood, iron, stainless steel, plastic, alloy steel, ceramic, glass for example, depending at least in part on intended uses and cost factors. In some instances plastic, wood or stainless steel may be preferable for non-toxic food applications. In this embodiment, glass is used.

A transfer canister 113 may be used to separate bulk from delivery material. Transfer canister 113 may be constructed of any one of a number of materials such as wood, iron, stainless steel, plastic, alloy steel, ceramic, glass for example, depending at least in part on intended uses and cost factors. In some instances plastic or stainless steel may be preferable for non-toxic food applications. In this embodiment, optically clear plastic is used.

A holding washer for insert container also called as transfer canister gasket 114 may be constructed of any one of a number of materials such as wood, iron, stainless steel, plastic, alloy steel, ceramic, glass for example, depending at least in part on intended uses and cost factors. In some instances plastic or stainless steel may be preferable for non-toxic food applications. In this embodiment, stainless steel is used.

A Transfer canister hole 115 can be used to facilitate material transfer form bulk area to transfer canister 133. The diameter of the hole can be varied to accommodate the diameter of actuator rod 102.

In use, container 112 is grasped by a hand and inverted. The plunger rod anti-mar anti-skid bumper 108 is placed on a surface such as a tabletop. The container 112 is pushed down to cause the actuator rod 102 to move to the product loading position where the product is loaded into the material loading hole 106. Upon relaxation of the spring loaded actuator rod 106, product is delivered to reservoir cup 103. Container 112 is then shaken to agitate product from reservoir cup 103 through exit hole perforations in perforated cap 109 to desired surface. It should also be noted that the apparatus can also have its rod plunged in an upright position then inverted and shaken/agitated/oscillated to release the metered dose of material. The apparatus is normally sealed; it can be carried on ones' person or in a pocket or purse. The intent of the design of this apparatus is to lower the salt intake for humans for consumer and retail use.

The plunger rod may comprise any one of wood, iron, stainless steel, plastic, alloy steel for example, depending at least in part on intended uses and cost factors. In some instances wood may be preferable for non-toxic food applications as well as wicking moisture from the bulk material. The diameter of actuator rod may, in other embodiments be increased or decreased to accommodate larger or smaller material acceptance hole to change the dose amount. The reservoir area may comprises any of wood, iron, stainless steel, plastic, and alloy steel, for example, depending at least in part on intended uses and cost factors. In some instances wood may be preferable for non-toxic food applications.

It will be apparent to a skilled artisan that the embodiments described above are exemplary of inventions that may have a greater scope than any of the singular descriptions. There may be alterations made in these examples without departing from the spirit and scope of the invention. For example, different apparatus for delivery of a metered dose of granular material may have different lengths and thicknesses. Containers may be of many shapes and materials, and may be provided with non-slip surfaces. Actuator rods may be of varied shapes to accommodate the materials delivered. These and many other features may change in different embodiments.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. An apparatus is provided for delivering a metered dose of a granular material comprising:
    a container assembly including a container to hold bulk material, a transfer canister including a reservoir cup for holding granular material which is captive at any angle until use,
    a cap portion covering the transfer canister; wherein the cap portion includes exit holes therethrough; and
    a plunger rod located therein and is plunged on a surface of the transfer canister;
    wherein granular material is sealed at any angle; by the plunger rod; wherein the granular material is evenly spread to a desired surface through the exit holes in the cap portion when agitated.

2. The apparatus of claim 1, wherein plunging the plunger rod delivers a metered amount of material from a material-loading hole to the reservoir cup; and wherein shaking the container assembly delivers the metered material through a screw-on cap through the exit holes.

3. The apparatus of claim 1, wherein the plunger rod may be any one of wood, iron, stainless steel, plastic, or alloy steel.

4. The apparatus of claim 1, wherein the transfer canister comprises any of wood, iron, stainless steel, plastic, or alloy steel.

5. The apparatus of claim 1, wherein a holding pin or e-ring for spring and is placed in the back region of the plunger rod to hold further assembly components captive.

6. The apparatus of claim 1, wherein a spring is utilized to keep a holding pin or e-ring for assembly flush with the container assembly comprises any one of wood, iron, stainless steel, plastic, or alloy steel.

7. The apparatus of claim 1, wherein a material loading hole is utilized to gather the granular material for dispersion; wherein a diameter of the material loading hole is determined based on the amount of material to be gathered for delivery.

8. The apparatus of claim 1, wherein a holding pin or e-ring for assembly is utilized to hold assembly components captive and is made of wood, iron, stainless steel, plastic, or alloy steel.

9. The apparatus of claim 1, wherein a plunger rod anti-mar anti-skid bumper is utilized to facilitate the plunger action on a surface without marring such surface and to prevent skidding when apparatus is used, wherein the plunger rod anti-mar anti-skid bumper is any of wood, iron, stainless steel, plastic, alloy steel.

10. The apparatus of claim 1, wherein a perforated cap may be used for the final delivery of material; wherein the perforated cap is any one of wood, iron, stainless steel, plastic, or alloy steel; wherein the perforated cap comprises any of a plug, threaded or other means to hold the perforated cap captive.

11. The apparatus according to claim 1, wherein a actuator rod guide is utilized to provide a slippery, non-binding guide for the plunger rod, wherein the actuator rod guide is any one of wood, iron, stainless steel, plastic, or alloy steel.

12. The apparatus of claim 1, wherein a perforation holes for delivery of material may be used for the final delivery exit of the material; wherein a size of the exit holes can be determined so as to facilitate the amount of agitation and/or aeration of the granular material during delivery.

13. The apparatus of claim 1, wherein the container assembly includes at a top portion thereof; wherein the container assembly is constructed of any of wood, iron, stainless steel, plastic, alloy steel, ceramic, or glass.

14. The apparatus of claim 1, wherein a transfer canister is utilized to separate bulk material from delivery material; wherein the transfer canister is any of wood, iron, stainless steel, plastic, alloy steel, ceramic, or glass.

15. The apparatus of claim 1, wherein a transfer canister gasket is constructed of any of wood, iron, stainless steel, plastic, alloy steel, ceramic, or glass.

16. The apparatus of claim 1, wherein a transfer canister hole is utilized to facilitate material transfer from a bulk area within the container assembly to a transfer canister; wherein a diameter of the transfer canister hole can be determined based on the diameter of plunger rod.

* * * * *